United States Patent [19]

Stange

[11] 4,092,874

[45] June 6, 1978

[54] ACTUATOR MECHANISM

[75] Inventor: William C. Stange, Ellicott City, Md.

[73] Assignee: The United States of America as represented by the Administrator of the National Aeronautics and Space Administration, Washington, D.C.

[21] Appl. No.: 747,675

[22] Filed: Dec. 6, 1976

Related U.S. Application Data

[63] Continuation-in-part of Ser. No. 596,787, Jul. 17, 1975, Pat. No. 4,010,455.

[51] Int. Cl.² .................................................. F16H 21/44
[52] U.S. Cl. ....................................... 74/100 R; 60/527
[58] Field of Search ........................ 74/100 R, 99, 88; 60/527, 528, 529; 292/144, 201

[56] References Cited

U.S. PATENT DOCUMENTS

| 3,150,243 | 9/1964 | Hermann | 74/100 |
|---|---|---|---|
| 3,184,914 | 5/1965 | Cole | 60/529 |
| 3,389,611 | 6/1968 | Bey | 74/88 |
| 3,917,327 | 11/1975 | Plasko | 292/201 |
| 3,946,628 | 3/1976 | Van Derlin | 74/88 |

Primary Examiner—Benjamin W. Wyche
Assistant Examiner—Wesley S. Ratliff, Jr.
Attorney, Agent, or Firm—Robert D. Marchant; John R. Manning; John O. Tresansky

[57] ABSTRACT

An actuator mechanism having a frame, a shaft rotatably supported in the frame, a positioning mechanism coupled to the shaft for rotating the shaft in two rotary positions disposed approximately 180° apart, and a pair of plungers coupled to the shaft each of which is responsive to a control signal for applying bi-directional rotation to the shaft respectively.

24 Claims, 9 Drawing Figures

ACTUATOR MECHANISM

ORIGIN OF THE INVENTION

The invention described herein was made by an employee of the United States Government and may be manufactured and used by or for the Government for governmental purposes without the payment of any royalties thereon or therefore.

CROSS REFERENCE TO RELATED APPLICATIONS

This application is a continuation-in-part of an application of William C. Stange, Ser. No. 596,787 filed July 17, 1975, now U.S. Pat. No. 4,010,455, entitled "Cyclical Bi-Directional Rotary Actuator", and assigned to the United States Government.

BACKGROUND OF THE INVENTION

This invention relates generally to actuator mechanisms and more particularly to actuator mechanisms for positioning a rotary shaft in two rotary positions disposed approximately 180° apart.

Actuator mechanisms are used to place devices into motion. One such device that utilizes an actuator is a magnetometer which measures the strength of a magnetic field. A magnetometer includes a core of magnetic material surrounded by a gating coil and a pickup coil which is driven by an alternating current source to periodically saturate and desaturate the magnetic core. The lines of flux of the ambient magnetic field passing through the core change the degree of saturation of the core produced by the magnetic field of the gating coil. Accordingly, the flux of the ambient magnetic field passing through the core induces a voltage which differs from the voltage induced by the gating coil as a function of the strength of the ambient magnetic field.

Magnetometers are sensitive to magnetic fields along the axis of the magnetic core and malfunction when different readings of the strength of the ambient magnetic field are obtained for positions of the core which are disposed about 180° apart. When such different readings have been obtained, the magnetometer must be recalibrated by introducing a correction factor to ensure proper operation. The correction factor is obtained by subtracting the reading obtained at the two core positions disposed 180° apart, dividing this quantity by 2 and then adding this quantity to the reading taken at the low reading position or, alternatively, subtracting it from the reading which is taken at the high reading.

Actuator mechanisms are used to rotate the magnetometer between the two positions so that readings of the magnetic field strength can be taken and compared to determine if the magnetometer is malfunctioning and needs calibration. Actuators used for rotating a shaft, and in particular a magnetometer, through angular displacements are well known. These actuators generally utilize one or more bimetallic springs which are wound in a convoluted configuration and are attached at their respective ends to the rotatable shaft and to a fixed point on a frame which rotatably supports the shaft. Application of heat to one of the bimetallic springs causes extension of the spring which rotates the shaft through an angular displacement. One disadvantage of these actuators is that once the heat is no longer applied to the spring, they begin to cool whereupon rotation of the shaft in the opposite direction occurs. There is no way of maintaining the shaft in the one position unless continuous heat having nonfluctuating temperature is applied.

Another disadvantage is that the surrounding environment may have a continuously changing temperature range which will effect the bimetal springs causing them to continuously bi-directionally rotate the magnetometer at different angular displacements when no rotation is desired.

Still another disadvantage is that the flexing life of bimetal springs is limited and the flexible characteristics of the bimetal springs degrade continually following each cycle of operation.

The afore-identified parent application disclosed an actuator which overcame the above and other disadvantages by utilizing a flexible spring whose flexibility is maintained over a large number of operational cycles and utilizes a locking mechanism to lock the shaft in the required rotary positions to counteract the temperature changes encounted and the removal of heat from the springs.

With the advent of interplanetary space exploration by manned and, in particularly, unmanned spacecraft a need arose for an actuator which will perform reliably over extremely long time periods as may be encountered by spacecraft traveling to a distant planet, such as Jupiter. In addition, since these actuators will encounter temperatures of −65° C or less, in deep space they must be designed to be able to perform their function at these low temperatures. The prior art spring devices are incapable of functioning under these conditions for the reasons previously given. For example, the spring device disclosed in the parent application degrades in performance over extremely long time periods and its modulus of elasticity is only maintained down to a temperature of +10° C. Whereupon the flexible characteristics required to rotate the shaft the desired angular displacement are not maintained.

SUMMARY OF THE INVENTION

Briefly, these and other objects are obtained by providing an actuator mechanism that is independent of the bimetallic spring operation to impart motion to a shaft or other device. The actuator mechanism generally includes a frame, a shaft rotatably supported in the frame, a mechanism for positioning the shaft in at least two rotary positions, and at least one pair of plunger devices coupled to the shaft in which each plunger is responsive to a control signal for applying bi-directional rotation to the shaft respectively.

Accordingly, one object of the invention is to provide an actuator mechanism for imparting motion to another device.

Another object of this invention is to provide an actuator mechanism that is not adversely affected by temperature fluctuations.

Still another object of the present invention is to provide an actuator mechanism that will continue required performance over a large number of cycles.

A further object of this invention is to provide an actuator mechanism that will satisfactorily operate at temperatures down to −65° C or less.

A still further object of this invention is to provide a new and improved actuator mechanism that will rotate a shaft between two rotary positions disposed 180° apart.

Another object of this invention is to provide a novel actuator mechanism that will rotate a shaft between two rotary positions disposed 180° apart at temperatures down to −65° C or less.

A further object of this invention is to provide an actuator mechanism that will rotate a magnetometer between two rotary positions disposed 180° apart at temperatures down to −65° C or less and will maintain those positions over a wide temperature range.

The above and further objects and novel features of the invention will appear more fully from the following detailed description when read in conjunction with the accompanying drawings.

BRIEF DESCRIPTION OF THE DRAWINGS

In the drawings where identical parts are designated by the same references.

DESCRIPTION OF THE PREFERRED EMBODIMENT

Figure 1:
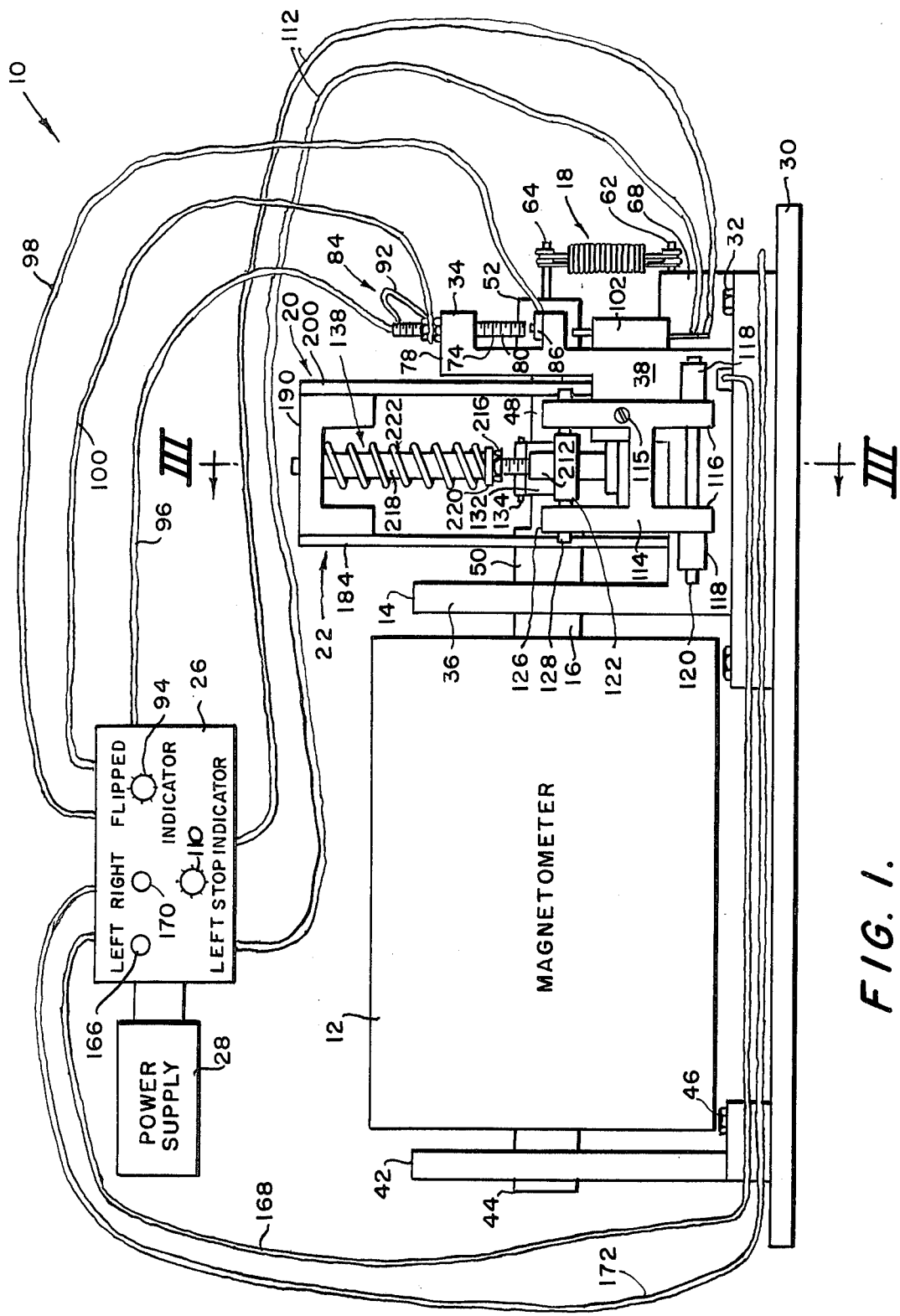
FIG. 1 is a side view of the actuator mechanism in association with a magnetometer.

FIG. 1 illustrates an actuator mechanism, generally designated by numeral 10, associated with a conventional magnetometer 12 which is to be rotated between two diametrically opposed positions for calibration in response to control signals applied to the actuator mechanism.

Generally, actuator mechanism 10 includes a frame 14 and a shaft 16 rotatably supported in frame 14. A positioning device, generally designated by numeral 18, is coupled to shaft 16 for placing shaft 16 in at least two rotary positions. At least one pair of plunger mechanisms, generally designated by numeral 20, is coupled to shaft 16. Each of the plunger mechanisms, generally designated by 22 and 24, is responsive to a control signal from a control panel 26 and a power supply 28 for applying bi-directional rotation, respectively, to shaft 16.

Figure 2:
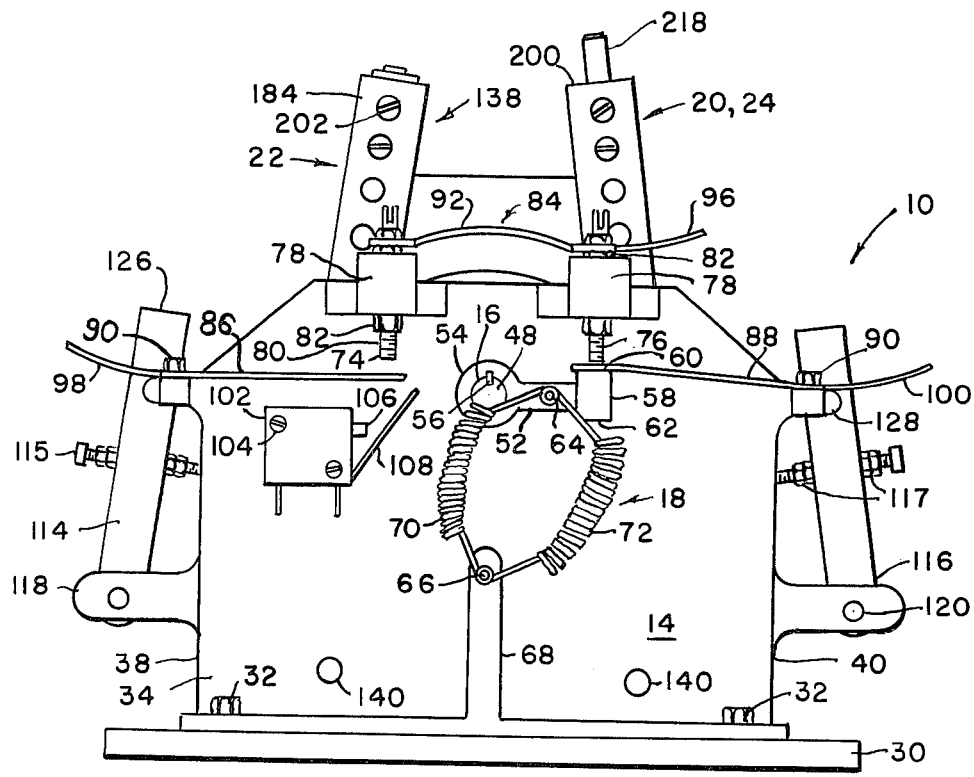
FIG. 2 is an end view of the actuator mechanism showing the device for positioning the magnetometer in two positions disposed 180° apart and the dual plunger device arrangement.
Figure 3:
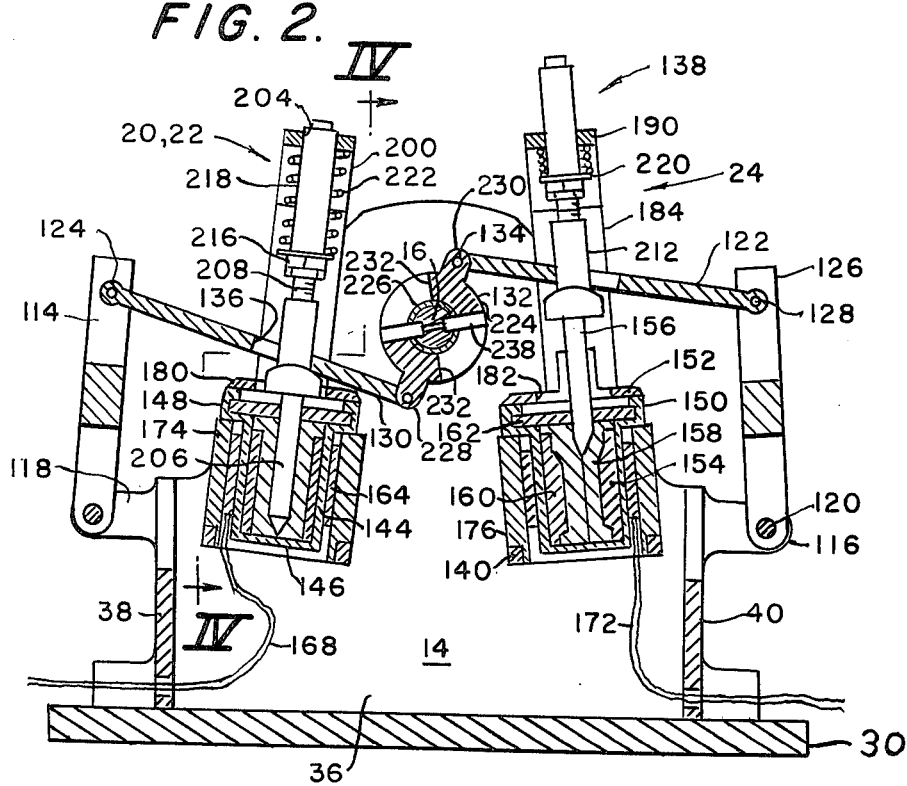
FIG. 3 is a cross sectional view of the actuator mechanism taken along the lines III—III of FIG. 1 showing the plunger devices.

Referring more particularly to FIGS. 1, 2 and 3, frame 14 is shown as mounted on support platform 30 such as by screw bolts 32. Frame 14 includes a front support 34 and a back support 36 spaced from and axially aligned with front support 34. Supports 34 and 36 are connected by a pair of side supports 38 and 40. Shaft 16, positioning device 18, and plunger mechanisms 22 and 24 are coupled to and supported by frame 14. When actuator mechanism 10 is associated with a magnetometer 12, frame 14 further includes a rear support 42 spaced from and axially aligned with support 36 for supporting one end 44 of the magnetometer. Support 42 is secured to support platform 30 such as by screw bolts 46. Supports 34, 36, 38, and 40 are preferably formed as an integral unit, however, they may be made separately and secured together such as by welding. When actuator 10 is used in conjunction with a magnetometer 12 it is preferably made from non-magnetic material such as aluminum, plastic, rubber, or other nonmetallic materials to not effect the operation of magnetometer 12.

Figure 4:
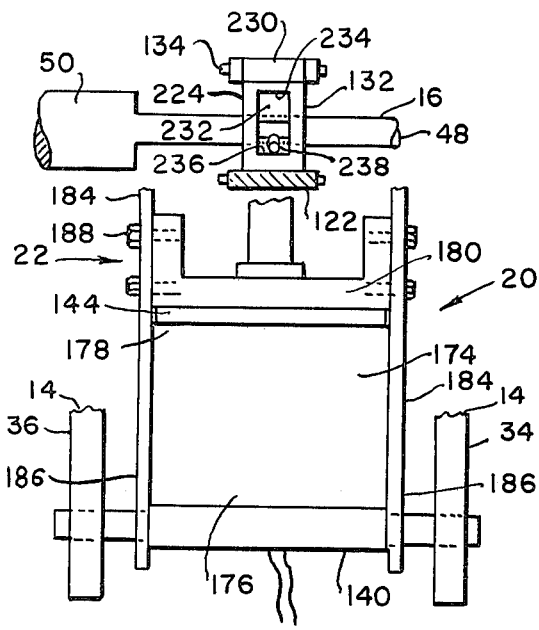
FIG. 4 is a side view of the plunger and coupling devices taken along the lines IV—IV of FIG. 3 showing the aperature and pin arrangement of the coupling and the support arrangement for the plunger device.
Figure 5:
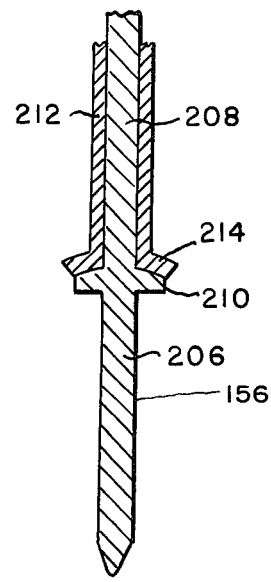
FIG. 5 is a cross sectional view of the piston and sleeve of FIG. 3 showing the support flange of the piston and sleeve.

Shaft 16, as shown in FIGS. 1, 2, and 4, includes a first end 48 which is rotatably supported in a bearing (not shown) and extends beyond front support 34. A second end 50 of shaft 16 is rotatably supported in a bearing (not shown) in back support 36. End portion 50 of shaft 16 preferably extends beyond support 36 and is secured by a pin (not shown) to magnetometer 12 so that when shaft 16 rotates magnetometer 12 also rotates. End 44 of magnetometer 12 is rotatably secured in a bearing (not shown) in support 42.

Positioning device 18 operates conjointly with plunger mechanisms 20 to rotate and position shaft 16 and magnetometer 12 in two rotary positions. Generally, plunger mechanisms 22 and 24 rotate shaft 16 a predetermined angular distance in the clockwise and counterclockwise direction, respectively, whereupon positioning device 18 further rotates shaft 16 and magnetometer 12 to position the magnetometer in either of the rotated positions. The detailed operation of the plunger mechanisms 20 and positioning device 18 will be more fully explained hereinafter.

As illustrated in FIGS. 1 and 2 positioning device 18 includes an arm 52 having one end 54 surrounding end 48 of shaft 16 that extends beyond support 34 and is secured to shaft 16 by a pin 56. Thus, when arm 52 rotates, shaft 16 will also rotate. The other end 58 of arm 52 includes a pair of substantially flat opposed surfaces 60 and 62. Arm 52 further includes a boss 64 extending therefrom. Another boss 66 protrudes from a portion 68 of support 34 and boss 66 is radially spaced from and vertically aligned with shaft 16. A pair of springs 70 and 72 are connected in compression between boss 64 and boss 66. Springs 70 and 72 are connected so that spring 70 is on compression and flexes on one side of bosses 64 and 66 while spring 72 is in compression and flexes on the other side of bosses 64 and 66, as shown in FIG. 2. A pair of stops 74 and 76 are secured to a pair of protrusions 78 on support 34 disposed on opposite sides of shaft 16. The stops include a threaded screw 80 that extends through protrusions 78 and are secured by nuts 82.

Screws 80 are positioned on either side of shaft 16 to permit surface 60 of arm 52 to be in alignment with screw 80 of stop 76, as shown in FIG. 2. Surface 62 of arm 52 is in alignment with screw 80 of stop 74 when shaft 16 has been rotated. The angle of rotation of shaft 16, is determined by the point where surface 60 contacts stop 76 and surface 62 contacts stop 74. Thus, by adjusting screws 80 the angle translated by shaft 16 can be varied. When associated with magnetometer 12, it is preferred that shaft 16, and consequently, magnetometer 12 be rotated approximately 180° to properly calibrate the magnetometer. Thus, screws 80 are adjusted so that when shaft 16 and arm 52 are rotated from a position where surface 60 is in contact with screw 80 of stop 76 to a position where surface 62 is in contact with screw 80 of stop 74, shaft 16 will have rotated approximately 180°.

Stops 74 and 76 preferably include a device, generally designed by 84, for signallying to a remote location that shaft 16 and arm 52 have rotated substantially the full 180° from stop 74 to stop 76 and vise versa and has not stopped at an intermediate position. Device 84 includes a pair of electrical contacts 86 and 88 which are secured to support 34 such as by screw bolts 90 on opposite sides of shaft 16. Each electrical contact 86 and 88 extend to a point spaced below and aligned with screws 80 of stops 74 and 76, respectively. When surface 62 of arm 52 is in contact with stop 74, electrical contact 86 will be in contact with screw 80 of stop 74 and when surface 60 of arm 52 is in contact with stop 76, electrical contact 88 will be in contact with screw 80 of stop 76.

Stop 74 is electrically connected to stop 76 by a conductor 92 while stop 76 is electrically connected to a flipped indicator lamp 94 in control panel 26 by a conductor 96. Electrical contact 86 is electrically connected to flipped indicator lamp 94 by a conductor 98 and electrical contact 88 is electrically connected to flipped indicator lamp 94 by a conductor 100. Flipped indicator lamp 94 is electrically connected to power supply 28. Thus, stops 74 and 76 are wired in parallel with lamp 94. When arm 52 is in contact with stop 76 an electrical circuit is completed between electrical contact 88, stop 76 and lamp 94, and with power supply 28 supplying the current, lamp 94 will illuminate. When arm 52 is in contact with stop 74 an electrical circuit is completed between electrical contact 86, stop 74, and lamp 94 lighting lamp 94. Thus, lamp 94 will illuminate when arm 52 is in contact with stop 74 or stop 76 and arm 52 will not be illuminated in any intermediate position. The lighting of lamp 94 serves to notify the control panel operator that magnetometer 12 is in the correct positions for calibration.

In the preferred embodiment shown in FIG. 1, lamp 94 indicates that shaft 16 and a magnetometer 12 have rotated substantially 180° and arm 52 is in contact with one of the stops 74 or 76, however, it does not indicate which stop is being contacted by arm 52. It is preferred that a microswitch 102 be secured such as by screws 104 to support 34 in the vicinity of one of the stops 74 or 76 illustrated with stop 74 in FIG. 2. Microswitch 102 includes an electrical contact 106 and a flexible electrical contact 108 which is positioned in the orbital path of arm 52. Microswitch 102 is electrically connected to a left stop indicator lamp 110 on control panel 26 by conductor 112 and lamp 110 is electrically connected to power supply 28. As arm 52 is rotated from stop 76 to stop 74 arm 52 contacts flexible contact 108 and pushes it against contact 106 which completes an electrical circuit to lamp 110. Thus, when arm 52 is in contact with stop 74 lamp 110 is illuminated thereby serving to alert the control panel operator that arm 52 is in contact with left stop 74. When arm 52 is in contact with stop 76 flexible contact 108 is out of engagement with contact 106 and the electrical circuit to lamp 110 is broken and lamp 110 remains unilluminated thereby serving to notify the control panel operator that arm 52 is in contact with the right stop 76. Although the above devices for signalling that arm 52 has rotated approximately 180° and upon which stop 74 or 76 arm 52 is in contact with is preferred, it should be understood, that other signaling arrangements may be used. For example, stops 74 and 76 may be individually wired to separate flipped indicator lamps in control panel 26 which would eliminate the need for microswitch 102. Another, alternative arrangement would be to connect the signaling devices to a signal transceiving device and have control panel 26 and power supply 28 connected to another signal transceiving device. Thus, the signaling devices could be remotely activated by radio waves or laser beams.

FIGS. 1-5 illustrate plunger mechanisms 20. In the preferred embodiment two plunger mechanisms 22 and 24 are utilized to bi-directionally rotate shaft 16 and magnetometer 12. Only one of the plunger mechanism 20 will be explained in detail since both plunger mechanisms are constructed substantially alike.

Plunger mechanisms 20 include a first member 114 pivotably mounted at one end 116 between spaced projections 118 on support 38 for plunger mechanism 22 and support 40 for plunger mechanism 24 by a pivot bar 120. Pivot bar 120 extends through projections 118 and end 116 of member 114 to permit member 114 to pivot thereabout. Member 114 may have an H configuration, as illustrated in FIG. 1, for light weightness, however, any shape may be used as long as it can pivot about bar 120. Member 114 includes an adjustable screw 115 extending through member 114 and secured thereto such as by nuts 117 and is adapted to contact a portion of side supports 38 and 40 to prevent unwanted over travel of member 114. A second member 122 is pivotally coupled at one end 124 between spaced ends 126 of member 114 by a pivot bar 128. Pivot bar 128 extends through ends 126 and end 124 and permits members 114 and 122 to pivot thereabout. The other end 130 of member 122 is pivotally coupled to a coupling 132 (to be explained hereinafter) by a pivot pin 134. Pivot pin 134 extends axially through coupling 132 and end 130 to permit coupling 132 and member 122 to pivot thereabout. Member 122 includes an aperture 136 extending therethrough and substantially centered between ends 124 and 130. A reciprocating piston device, generally designated by numeral 138, is pivotally coupled between front and back supports 34 and 36, respectively, by a trunnion 140. Reciprocating piston device 138 extends through aperture 136 in second member 122 and is adapted to apply pivotal motion to second member 122 upon activation by a control signal from control panel 26 for rotating shaft 16.

Reciprocating piston device 138 includes a cylindrical enclosure 144 which is closed at its bottom 146. The other end 148 of enclosure 144 includes an outwardly extending flange 150 and an internal circumferentially extending groove 152. An expansion and contraction device 154 is enclosed within enclosure 144. A movable piston 156 extends into enclosure 144 and is surrounded by an expansion and contraction device 154. Expansion and contraction device 154 may include a flexible sleeve 158 which surrounds piston 156 with an outer diameter substantially smaller than the inner diameter of enclosure 144. Flexible sleeve 158 is preferably made of any flexible material, such as rubber. An expandable material 160 surrounds flexible sleeve 158 in the space between the outer periphery of flexible sleeve 158 and the inner periphery of enclosure 144. Expandable material 160 is preferably heat sensitive which upon the application of heat will increase in volume to cause flexible sleeve 158 to compress around piston 156 and thereby push piston 156 out of enclosure 144, as shown by plunger mechanism 24 in FIG. 3. It is also preferred that expandible material 160 have a volume increase of approximately 14% when it is heated and upon the removal of the heat that its volume return to normal. A suitable material having these characteristics is paraffin wax.

Piston device 138 further includes a seal ring 161 within groove 152 to seal expansion and contraction device 154 within enclosure 144. Piston 156 extends through and is in sliding contact with seal ring 162. A heater element 164 surrounds the outer periphery of enclosure 144. Heater element 164 associated with plunger mechanism 22 is connected to left switch 166 on control panel 26 by conductor 168 and heater element 164 associated with plunger mechanism 24 is connected to right switch 170 by conductor 172. Heater element 164 may be conventional heater such as, for example, a heating wire made of tungsten, sandwiched between layers of insulating fabric. The heater element 164 is preferably secured to the outer periphery of enclosure 144 such as by bonding. When switch 166 or 170 is depressed an electrical circuit is completed between power supply 28 and heater element 164 associated with plunger mechanisms 22 and 24, respectively, thereby causing heater element 164 to conduct heat through enclosure 144 into expandable material 160. As the expandable material heats it will melt and increase in volume. When switches 166 and 170 are released the electrical circuit is broken and heater elements 164 stops conducting heat thereby causing expandable material 160 to cool and contract to its normal volume.

Piston device 138 includes a sleeve 174 which surrounds heater element 164 and is supported at one end 176 on trunnion 140. Flange 150 on enclosure 144 abuts the other end 178 of sleeve 174. Thus, enclosure 144 is supported by sleeve 174 which, in turn, is supported by a trunnion 140 pivotally supported in supports 34 and 36. A cap 180 having a central opening 182 engages the top of flange 150 and piston 156 extends through opening 182. A pair of rigid supports 184 are secured at one end 186 to trunnion 140 on opposite sides of sleeve 174 and axially extend above enclosure 144. Cap 180 is secured to supports 184 such as by screws 188. A cross support 190 is secured between the other ends 200 of supports 184 such as by screws 202 and contains an opening 204 therethrough in substantial alignment with piston 156.

Piston 156 includes a lower portion 206 which extends into enclosure 144 and is surrounded by flexible sleeve 158 and a threaded upper portion 208 which extends through opening 136 in second member 122 and through opening 204 in cross support 190. An outwardly extending flange 210 separates portions 206 and 208. Flange 210 is preferably an integral part of piston 156, however, it may be a separate portion secured to lower and upper portions 206 and 208, respectively, such as by welding. Flange 210 is positioned between cap 180 and second member 122 and has an outer diameter substantially greater than the diameter of opening 136. Thus, when piston 156 is pushed out of enclosure 144 flange 210 bears upon member 122 pivoting member 122 about pin 128 and 134 thereby causing shaft 16 to rotate. If desired, a sleeve 212 having a lower flange 214 abutting flange 210 can surround a portion of upper portion 208 and extend through opening 136 to protect upper portion 208 from wearing against member 122.

Piston 156 further includes a nut 216 threaded on upper portion 208 between the top of sleeve 212 and cross support 190. A sleeve 218 preferably surrounds upper portion 208 and extends from nut 216 through opening 204 in cross support 190 and includes a flange 220 abutting nut 216. A spring 222 surrounds upper portion 208 and sleeve 218 between flange 220 and cross support 190. In the relaxed position, as shown by plunger mechanism 22 in FIG. 3, spring 222 is not compressed; while in the activated position, as shown by plunger mechanism 24, spring 222 is compressed between flange 220 and cross support 190. When expandable material 160 contracts due to the elimination of heat therefrom, spring 222 expands and pushes lower portion 206 back into enclosure 144 without pivoting member 122. As can be readily observed, plunger mechanisms 22 and 24 eliminates the disadvantages associated with bi-metal and flexible spring actuators of prior art devices. Since, plunger mechanisms 20 operate by a piston 156 and expandable material 160 they do not operate or change shape due to fluctuating temperatures. Further, since plunger mechanisms 20 do not depend on flexibility for operation extremely low temperatures, that is, below +10° C, do not have any adverse effect on them.

Referring to FIGS. 3, 4 and 6–9, coupling 132 connects second member 122 to shaft 16. Coupling 132 includes a sleeve 224 which surrounds and is in sliding contact with shaft 16. A bearing 226 may be interposed between shaft 16 and sleeve 224 to reduce friction therebetween. A pair of projections 228 and 230 oppositely positioned are integrally formed on sleeve 224. Projections 228 and 230 are pivotably connected to ends 130 of second members 122 by pivot pins 134. It is preferred that projection 230 be positioned to the right of normal line N and projection 228 be positioned to the left of normal line N when they are coupled to members 122. Furthermore, projections 228 and 230 are preferably maintained to the left and right of normal N, respectively, even after shaft 16 has rotated substantially 180° because members 122 initially start the rotation of shaft 16. For a clockwise rotation projection 228 is preferably to the left of normal N for applying clockwise torque to shaft 16. Projection 230 is preferably to the right of normal N for applying counterclockwise torque to shaft 16. Thus, while shaft 16 rotates substantially 180°, coupling 132 preferably rotates less than 180°. To maintain projections 228 and 230 in their proper locations screws 115 on members 114 are adjusted to contact supports 38 and 40 to prevent coupling 132 from additionally rotating about shaft 16 and placing projections 228 and 230 on the wrong sides of normal N.

Figure 6:
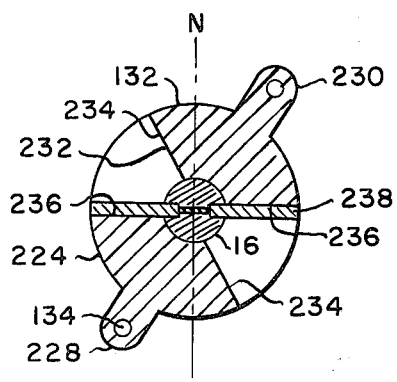
FIGS. 6–9 are views of the coupling of FIG. 3 in cross section showing the sequential positions of the coupling and shaft during 180° of rotation.

Sleeve 224 includes a pair of oppositely positioned tapered openings 232 which extend from the outer periphery inwardly to bearing 226 and are substantially centered between projections 228 and 230. The sides 234 and 236 of openings 232 are preferably formed at approximately 60° (to be explained hereinafter); however, they may be formed at any obtuse angle suitable to the design characteristics of actuator mechanism 10. A pin 238 extends through shaft 16 and bearing 226 and into openings 232. Pin 238 is secured in shaft 16 such as by a press fit. Thus, shaft 16 is permitted to rotate about coupling 132 approximately 60°, that is, from the point, when pin 238 disengages with side 236 to the point when pin 238 engages with side 234 (FIG. 6).

Referring to FIG. 1, control panel 20 may be a conventional electronic control and power supply system 28 such as, a D.C. power supply. Control panel 20 includes a flipped indicator lamp 94 which completes a circuit and illuminates when arm 52 is in contact with either stop 74 or 76 to visually indicate that shaft 16 has rotated between the stops. Control panel 26 also includes a left stop indicator lamp which completes a circuit and is illuminated only when arm 52 is in contact with stop 74 to visually indicate the position of shaft 16 and magnetometer 12. A left and right switch 166 and 170 are also included and when depressed will complete a circuit to heater 164 on plunger mechanism 22 and 24, respectively, to activate the same and rotate shaft 16 clockwise and counterclockwise. The controls on control panel 26 may be any conventional type of lamps and switches or they may be a part of a signal transceiver and actuator device 10 may be connected to another signal transceiver and the various lamps, switches and heaters may be activated by electromagnetic signals such as radio waves or laser light.

In operation, and referring to FIGS. 1-9, actuator mechanism 10 is shown associated with a magnetometer 12 in which actuator mechanism 10 rotates magnetometer 12 between two rotary positions disposed approximately 180° apart. By taking magnetic readings from these two positions magnetometer 12 can be properly calibrated. For illustration purposes only it is to be assumed that actuator mechanism 10 is initially in the position shown in FIGS. 1, 2, 3, and 6. In this position, arm 52 is in contact with electrical contact 88 and stop 76 thereby completing an electrical circuit through conductors 96 and 100 to flipped indicator lamp 94 in control panel 26 and power supply 28 for illuminating lamp 94. In addition, left stop indicator lamp 110 is not illuminated since the circuit is interrupted by microswitch 102 thus, indicating that arm 52 is in contact with stop 76. Further, coupling 132 is in the position shown in FIGS. 3 and 6, i.e., projection 228 is on the bottom and to the left of normal N and pin 230 is in contact with sides 236 of openings 232 in sleeve 224.

When it is desired to rotate magnetometer 12 to its second rotary position the control panel operator depresses left switch 166 on control panel 261 thereby completing an electrical circuit between power supply 28 and heater 164 associated with plunger mechanism 22. As heater 164 is energized by the electrical current it heats enclosure 144 which, in turn, heats expandable material 160 causing it to change to a liquid state, and increase in volume by substantially 14%. The heated expandable material 160 compresses flexible sleeve 158 around lower portion 206 of piston 156. The compressive force of sleeve 158 forces lower portion 206 to rise out of enclosure 144. As piston 156 rises flange 214 of sleeve 212 contacts second member 122. The movement of piston 156 causes member 122 to pivot about pin 128 forcing end 130 upward. This upward movement rotates coupling 132 clockwise and since pin 238 is in contact with sides 236 of coupling 132 shaft 16 and magnetometer 12 also rotate clockwise. The rising of piston 156 causes spring 222 to be compressed between flange 220 of sleeve 218 and cross support 190. Simultaneously, arm 52 rotates clockwise breaking the electrical circuit at stop 76, thereby causing lamp 94 in control panel 26 to be extinguished and, in addition it compresses springs 70 and 72.

Figure 8:
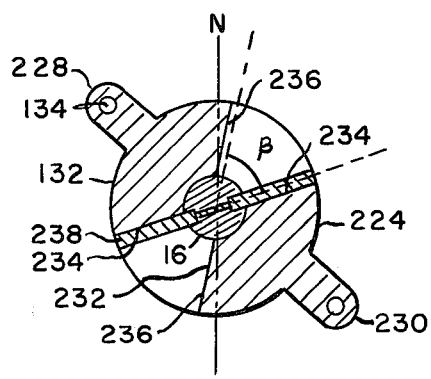
Figure 7:
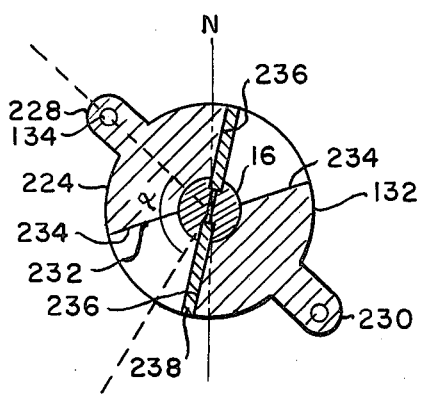

Piston 156 continues to rise and clockwise rotate coupling 132, shaft 16, magnetometer 12, and arm 52 until projections 228 and 230 have rotated an angle α of substantially 100°, as shown in FIG. 7. At this point it is preferred that lower portion 206 of piston 156 be substantially out of enclosure 144 so that the flexible sleeve no longer applies sufficient force to cause any further movement of piston 156. Arm 52 has now rotated more than 90° and compressed springs 70 and 72 cause a clockwise force to be applied to arm 52. This clockwise force rotates arm 52, shaft 16, and magnetometer 12 in the clockwise direction. Since the clockwise force is now applied to arm 52 and shaft 16 rather than to coupling 132 which contains opening 232, shaft 16 and pin 238 continue a clockwise rotation while coupling 132 remains stationary. Arm 52, shaft 16 and pin 238 continue the clockwise rotation until pin 238 has rotated an angle β of substantially 60° within opening 232 and pin 238 contacts side 234 of coupling 132. This position is illustrated in FIG. 8 and the total clockwise rotation of arm 52, shaft 16 and magnetometer 12 is approximately 160°.

Figure 9:
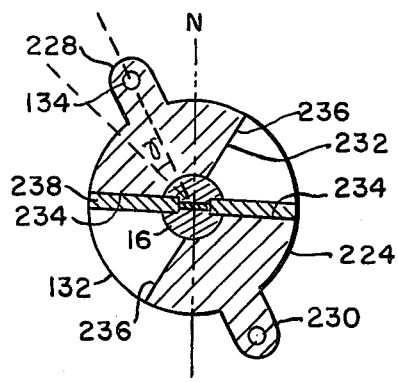

Springs 70 and 72 continue to apply a clockwise force to arm 52 while arm 52, shaft 16, magnetometer 12, and coupling 132 continue to rotate clockwise. Arm 52 contacts flexible contact 108 of microswitch 102 to engage rigid contact 106. The closing of contacts 106 and 108 completes an electrical circuit through left stop indicator lamp 110 on control panel 26 to illuminate lamp 110. The clockwise rotation of arm 52 shaft 16, magnetometer 12 and coupling 132 continues for an angle γ of substantially 20° until arm 52 is in contact with stop 74. This additional rotation of angle γ by coupling 132 is shown in FIG. 9. When arm 52 contacts stop 74 it completes an electrical circuit through electrical contact 86, conductors 98, 92, and 96 to flipped indicator lamp 94 to illuminate the same. Thus, both lamps 94 and 110 are illuminated to visually notify the control panel operator that magnetometer 12 has rotated substantially 180° and that arm 52 is in contact with left stop 74.

After arm 52 is in contact with stop 74, adjusting screws 115 on member 114 are in contact with side supports 38 and 40 thereby preventing any further clockwise rotation of coupling 132. Since coupling 132 has rotated only approximately 120°, projections 228 and 230 remain on the same side of normal N. After the substantially 180° rotation of magnetometer 12 switch 166 on control panel 26 is released breaking the electrical circuit to heater 164 in plunger mechanism 22 thereby causing heater 164 to cool which, in turn, causes expandable material 160 to cool. As expandable material 160 cools it contracts in volume by approximately 14% thereby releasing the compressive force around lower portion 206 of piston 156 by flexible sleeve 158. With sleeve 158 no longer exerting pressure on piston 156, compressed spring 222 forces lower portion 206 of piston 156 back into enclosure 144.

When counterclockwise rotation of magnetometer 12 is desired the control panel operator depresses the right switch 170 on control panel 26 which completes an electrical circuit between power supply 28 and heater 162 of plunger mechanism 24. The sequence of events is substantially similar to that explained for clockwise rotation, and therefore, will not be further explained except where necessary. As arm 52 rotates counterclockwise it no longer contacts microswitch 102 thereby breaking electrical contact between contacts 108 and 106 and causing lamp 110 to be extinguished. This visually indicates that arm 52 is now in contact with stop 76.

An actuator mechanism has been disclosed for rotating a shaft bi-directionally especially suitable for use in an outer space environment. Obviously modifications and variations of the disclosed invention are possible in the light of the above teachings. It is to be understood therefore that within the scope of the appended claims the invention may be practiced otherwise than as specifically described and illustrated.

Accordingly, the invention having been described in its best embodiment and mode of operation, that which is desired to be claimed by Letters Patent is:

1. An actuator mechanism comprising:
   frame means;

shaft means rotatably supported in said frame means;
means for positioning said shaft means in at least two rotary positions;
at least one pair of plunger means coupled to said shaft means, each of said plunger means being responsive to a control signal for applying bidirectional rotation to said shaft means respectively; and
coupling means joined between said shaft means and each of said plunger means, said coupling means including;
sleeve means surrounding said shaft means and in sliding engagement therewith, said sleeve means having an elongated aperture extending therethrough for exposing said shaft means, and
pin means connected to said shaft means and radially extending through said aperture, said pin and shaft means being slidable within said aperture and sleeve means respectively for a determinable angle before said pin means contacts said sleeve means.

2. The actuator mechanism of claim 1 wherein said two rotary positions are disposed substantially 180° apart.

3. The actuator mechanism of claim 1 wherein said coupling means permits each of said plunger means to simultaneously rotate said sleeve means and said shaft means for a predetermined angular displacement and to permit said shaft means to rotate said determinable angle with respect to said sleeve means.

4. The actuator mechanism of claim 3 wherein said predetermined angular displacement is substantially 120°.

5. The actuator mechanism of claim 4 wherein said predetermined angular displacement includes:
a first angular displacement of substantially 100°; and
a second angular displacement of substantially 20° separated from said first angular displacement by said determinable angle.

6. The actuator mechanism of claim 5 wherein said determinable angle is substantially 60°.

7. The actuator mechanism of claim 1 wherein said positioning means includes:
arm means coupled at one end to said shaft means;
spring means joined to said arm means for rotating said arm means; and
stop means disposed on either side of said shaft means, said arm means alternately contacting each of said stop means upon clockwise and counterclockwise rotation of said shaft means and said stop means limiting said rotation of said shaft means.

8. The actuator mechanism of claim 7 wherein said stop means limits said rotation of said shaft means to substantially 180°.

9. The actuator mechanism of claim 8 wherein each of said stop means includes means for signaling when said shaft means has rotated substantially 180°.

10. The actuator mechanism of claim 9 wherein said signaling means includes an electrical contact disposed between each of said stop means and said arm means for completing an electrical circuit when said arm means contacts said stop.

11. The actuator mechanism of claim 10 further including another means for signaling which of said stops said arm means is in contact with.

12. The actuator mechanism of claim 11 wherein said another signaling means includes:

a microswitch adjacent to one of said stops and having an electrical contact in alignment with said arm means; and
means responsive to the closing of said electrical contact for signaling that said arm means is in contact with said one stop.

13. The actuator mechanism of claim 1 wherein each of said plunger means includes:
a first member;
a second member pivotably coupled between said first member and said shaft means; and
reciprocating piston means coupled to said second member, said piston means applying pivotal motion to said second member upon activation for rotating said shaft means.

14. The actuator mechanism of claim 13 wherein said first member is pivotably coupled between said frame means and said second member.

15. The actuator mechanism of claim 13 wherein said piston means is pivotably coupled to said frame member.

16. The actuator mechanism of claim 13 wherein said piston means includes:
a cylinder;
expansion and contraction means within said cylinder;
a movable piston rod having a portion thereof surrounded by said expansion and contraction means, another portion thereof extending through said second member, and a shoulder portion surrounding said another portion and in abutting contact with said second member, said piston rod contacting and pivoting said second member upon expansion of said expansion and contraction means.

17. The actuator mechanism of claim 16 wherein said piston means further includes means for pushing said piston into said expansion and contraction means upon contraction thereof.

18. The actuator mechanism of claim 17 wherein said pushing means is a spring, said spring being compressed when said piston is pivoting said second member.

19. The actuator mechanism of claim 16 wherein said piston means further includes heater means surrounding the outer periphery of said cylinder.

20. The actuator mechanism of claim 16 wherein said expansion and contraction means includes:
a flexible sleeve surrounding said portion of said piston within said cylinder; and
expandable means surrounding said flexible sleeve within said cylinder, said expandable means increasing in volume in response to said control signal for compressing said flexible sleeve around said piston and forcing said piston out of said cylinder.

21. The actuator mechanism of claim 20 wherein said flexible sleeve is rubber.

22. The actuator mechanism of claim 20 wherein said expandable means increases in volume in response to the application of heat thereto and returns to its unexpanded state upon removal of said heat.

23. The actuator mechanism of claim 22 wherein said increase in volume of said expandable means is substantially 14%.

24. The actuator mechanism of claim 23 wherein said expandable means is paraffin wax.

* * * * *